UNITED STATES PATENT OFFICE.

LÉON CERF, OF LYONS, FRANCE.

PROCESS OF MAKING MODIFIED STARCH.

SPECIFICATION forming part of Letters Patent No. 698,632, dated April 29, 1902.

Application filed July 3, 1901. Serial No. 67,066. (No specimens.)

*To all whom it may concern:*

Be it known that I, LÉON CERF, a citizen of France, residing at Lyons, France, have invented certain new and useful Improvements in the Process of Making Modified Starch, of which the following is a full, clear, and exact description, and for which I have made applications for patents in France on the 29th day of April, 1901, and in Great Britain on the 25th day of May, 1901.

The invention has for its object the transformation of amylaceous matters into soluble substances. This result is obtained by treating these matters with persulfates in presence of water. This treatment is particularly applicable to amylaceous matter extracted from the roots of plants—potatoes, tapioca, &c.—which it transforms into products soluble in water and giving gelatinous solutions, to amylaceous matters—such as starch of wheat, maize, rice, &c—and finally to natural products containing various proportions of amylaceous matters—for example, those obtained by grinding of wheat, sorghum, maize, cocoa, and other alimentary substances. The products obtained are characterized by their complete neutrality after washing and by their solubility, which permits of their use for numerous applications, and particularly to replace gelatin in many industrial uses.

The following is an example of this treatment applied to fecula: Mix one hundred kilograms of fecula with five kilograms of dry persulfate of ammonia. Add one hundred and fifty liters of cold water, agitate the mass. Oxygen is disengaged according to the formula:

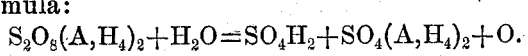

$$S_2O_8(A,H_4)_2 + H_2O = SO_4H_2 + SO_4(A,H_4)_2 + O.$$

Allow the action to continue during about twelve hours, continuing to agitate the mass from time to time. After this lapse of time the starch of the fecula arrives at its maximum oxidation. Allow it to rest, decant, and filter. Wash it to the complete elimination of the sulfate of ammonia and of the sulfuric acid, which is ascertained by the usual reagents. Dry it in a stove at any desired temperature. The obtained product has the principal properties of gelatin and can replace the latter in its principal industrial applications, such as finishing of stuffs, coating of photographic plates, dressing of cotton threads before the weaving, preparation of medicinal capsules, &c. Heated in water it thickens and then liquefies and gives an absolutely transparent and colorless solution, becoming a gelatinous mass on cooling.

In the treatment the persulfate of ammonia may be replaced by the persulfates of soda, potash, or other persulfates, and the proportions given in the above example may be modified according to requirements. The fecula can also be replaced by the substances above referred to.

What I claim as my invention, and desire to secure by Letters Patent, is—

The herein-described process consisting in mixing amylaceous water with persulfates and water, substantially as described.

In witness whereof I have hereunto set my hand in presence of two witnesses.

LÉON CERF.

Witnesses:
GASTON JEAUNIAUX,
M. V. RACHON.